United States Patent Office 3,336,843
Patented Aug. 22, 1967

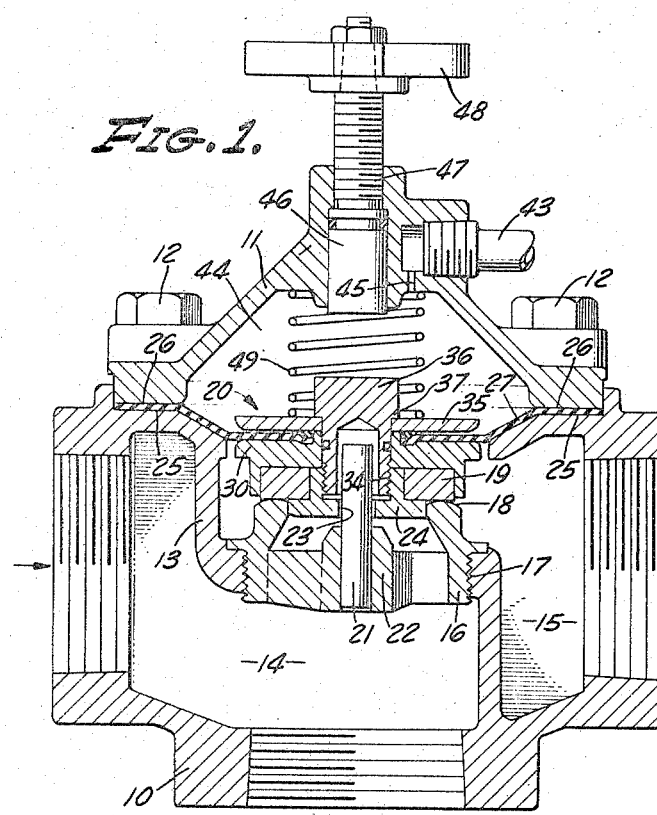
Aug. 22, 1967     D. E. GRISWOLD     3,336,843
DIAPHRAGM ACTUATOR CONSTRUCTION
Original Filed Feb. 12, 1964
INVENTOR.
DAVID E. GRISWOLD
BY
ATTORNEYS.

3,336,843
DIAPHRAGM ACTUATOR CONSTRUCTION
David E. Griswold, Costa Mesa, Calif., assignor to Griswold Controls, Santa Ana, Calif., a corporation of California
Continuation of application Ser. No. 344,449, Feb. 12, 1964. This application Apr. 11, 1966, Ser. No. 541,582
6 Claims. (Cl. 92—100)

ABSTRACT OF THE DISCLOSURE

A diaphragm mounting for valves and the like. The peripheral portion of a flexible diaphragm is mounted between a pair of rigid elements, one of which includes a groove and lip. The peripheral portion of the diaphragm is adjacent to the lip, and an elastomeric ring is caused by the other rigid element to exert a sealing and clamping force against the diaphragm, the peripheral portion of which is deflected axially and offset into the groove by the ring, and the ring forms a seal against the lip to isolate the peripheral edge of the diaphragm.

---

This application is a continuation of my copending application Ser. No. 344,449, filed Feb. 12, 1964 now abandoned.

This invention relates to pressure-operated valves and is particularly concerned with an improved mounting for securing a periphery of an annular flexible diaphragm to the movable closure member of the valve. The other periphery of the annular flexible diaphragm is clamped between parts of the valve body.

It is the principal object of this invention to provide a new sealing connection for the peripheral edge of an annular flexible diaphragm.

Another object is to provide a diaphragm mounting which permits the use of a diaphragm cut from sheet stock and does not require custom molding of the diaphragm. Another object is to provide a positive seal for the center hole cut edge of the diaphragm in order to prevent exposure of the cut edge to fluid pressure in the valve system. Another object is to provide a diaphragm mounting wherein the flexible diaphragm material is clamped between positive stops and yet has a controlled clamping force.

Another object is to provide a diaphragm mounting which serves to lock a peripheral edge of the diaphragm to an adjacent metallic member in such a manner that the parts do not work loose after a period of service. Another object is to provide a diaphragm clamping construction which permits the use of a range of resilient stock thicknesses for the diaphragm without changing the dimensions of the metal clamping parts. Another object is to provide a diaphragm mounting in which the clamping parts are of minimum diameter in order to achieve maximum effective area of the flexible diaphragm.

Other and more detailed objects and advantages will appear hereinafter.

In the drawings:
FIGURE 1 is a sectional side elevation showing construction of a pressure-actuated valve having an annular flexible diaphragm connecting the valve body to the movable closure member.

FIGURE 2 is a fragmentary sectional elevation showing certain of the parts illustrated in FIGURE 1 and illustrating the initial position of the parts prior to clamping of the diaphragm.

FIGURE 3 is a view similar to FIGURE 2, showing the parts in clamped position.

FIGURE 4 is a view similar to FIGURE 2, showing the parts in initial position illustrating the use of diaphragm sheet stock of greater thickness.

FIGURE 5 is a view similar to FIGURE 4, showing the parts in clamped position.

Referring to the drawings, the valve body 10 which is of the globe or angle pattern is provided with a cover 11, secured in place by threaded fastenings 12. The body 10 has a divider wall 13 positioned between the inlet chamber 14 and the outlet chamber 15. A seat member 16 is secured by threads 17 to the divider wall 13, and this seat has a seating surface 18 adapted to be contacted by the sealing disk 19 carried on the movable valve closure generally designated 20. A stem 21 is fixed to a central boss 22 on the valve seat 16 and projects axially through a cylindrical guide surface 23 provided on the disk guide 24, thereby serving to guide the movable valve closure 20 toward and away from the seat surface 18. When the parts are in the position shown in FIGURE 1, the valve is closed. When the movable closure member 20 moves axially away from the seat 16, flow of fluid occurs from the inlet chamber 14 through the interior of the valve seat 16 and into the outlet chamber 15.

The body 10 and cover 11 have annular confronting faces 25 and 26 which clamp the outer peripheral edge of a flexible resilient diaphragm 27. In accordance with this invention, the inner peripheral edge of the annular diaphragm 27 is clamped to the movable closure member 20 by means of an elastomeric O-ring 28 and an annular groove 29. The groove 29 is provided on the disk retainer 30 on the upper surface thereof and near its inner diameter. The upstanding annular lip 31 on the disk retainer 30 forms the inner boundary of the groove 29. The upper end of the lip 31 is rounded, as shown at 32 and 33. The axial distance from the bottom of the groove 29 to the top of the lip 31 is substantially less than the combined axial thickness of the diaphragm 27 and the O-ring 28. Accordingly, when the parts are moved from the position shown in FIGURE 2 to the position shown in FIGURE 3, the upper end of the lip 31 is brought into metal-to-metal contact with the under surface of the follower plate 35. This clamping action is accomplished by turning the disk guide 24 with respect to the thimble 36 along the threads 34. The reaction forces between lip 31 and plate 35 place a tension force on thimble 36. A shoulder 37 on the thimble engages the upper surface of the follower plate 35. The O-ring 28 distorts under the axial clamping load and forces the inner peripheral portion of the flexible diaphragm 27 to seat in offset position within the groove 29. The rounded corners 32 and 38 prevent cutting of the O-ring 28 or the flexible diaphragm 27. A seal ring 40 prevents leakage between the thimble 36 and the disk retainer 30.

FIGURES 4 and 5 show how the same metallic parts 30, 35, and 36 may be employed to clamp a diaphragm of greater thickness. The metal parts are the same as previously described, but the diaphragm 27a is thicker than the diaphragm 27. Accordingly, an O-ring 28a is selected which is correspondingly thinner in cross-section than the O-ring 28, so that the total initial thickness of the flexible diaphragm and O-ring are substantially the same as before. FIGURE 4 shows the position of the parts before applying axial clamping force to the diaphragm 27a and O-ring 28a. FIGURE 5 shows the position of the parts after the clamping force is applied by means of the threads 36 between the disk guide 24 and thimble 36. The O-ring 28a distorts and forces the inner periphery of the diaphragm 27a into the groove 29.

The small arrows in FIGURES 3 and 5 of the drawings illustrate the compression forces which are applied by the distorted O-ring against the diaphragm and against the metal parts.

From the foregoing description, it will be understood that the flexible diaphragm which is cut from sheet stock is positively sealed at its inner periphery in a manner so that its cut edge 41 is not exposed to fluid pressures in the valve system. The metal-to-metal contact between the lip 31 and the underside of the follower plate 35 provides a positive stop, yet controls the clamping force applied to the flexible diaphragm. Moreover, the clamping area of the diaphragm is kept to a minimum adjacent the inner periphery thereof, so that the major portion of the surface of the diaphragm is responsive to fluid pressures on opposite sides thereof.

A control pipe 43, threaded into the cover 11, is connected to a valve, not shown, for controlling admission and escape of fluid from the chamber 44 by way of the port 45. Pressure in the valve outlet chamber 15 acts on the undersurface of the flexible diaphragm 27, and pressure in the chamber 44 acts on the upper surface of the diaphragm. The valve spring 49 acts in a direction to hold the disk 19 against the seat surface 18. An adjustable stop 46 is connected to the cover 11 by threads 47. Manual turning of the handle 48 causes the stop 46 to be positioned at the desired height to engage the upper end of the thimble 36 to limit opening movement of the movable valve member 20.

Having fully described my invention, it is to be understood that I am not to be limited to the details herein set forth, but that my invention is of the full scope of the appended claims.

I claim:
1. An annular flexible diaphragm having a peripheral portion and a mounting for the said peripheral portion of said annular flexible diaphragm, said mounting comprising: a pair of axially spaced rigid elements, one of the elements having an axially extending lip and an annular groove adjacent said lip, an elastomeric ring, the peripheral portion of the flexible diaphragm being adjacent to said lip and being positioned between the groove and said ring, and clamping means acting against said elements for deflecting the peripheral portion of the diaphragm axially and offset into said groove by distortion of the ring under force of said clamping means, said distorted ring forming a seal against said lip and also exerting a sealing and clamping force through the diaphragm and against the opposing elements to thereby isolate the peripheral portion of said flexible diaphragm in said groove from external fluid pressures.

2. The combination set forth in claim 1 in which said lip is received by the inner peripheral portion of said flexible diaphragm.

3. The combination set forth in claim 2 in which the mounting is movable in an axial direction as said annular flexible diaphragm is flexed.

4. An annular flexible diaphragm having a peripheral portion and a mounting for the peripheral portion of said annular flexible diaphragm, said mounting comprising: a pair of axially spaced rigid elements, said elements having radially extending confronting faces receiving a portion of the flexible diaphragm therebetween, one of said elements having an axially extending lip on its periphery extending above the face on said element, the said one element having an annular groove adjacent said lip and extending below said face on said element, the groove having a bottom surface parallel to said face, a convex shoulder on said element joining the bottom of said groove to said face, an elastomeric O-ring, the peripheral portion of the flexible diaphragm being adjacent to said lip and being positioned between the groove and said O-ring, and clamping means acting against said elements for deflecting the peripheral portion of the diaphragm axially and around said convex shoulder and offset into said groove by distortion of the O-ring under force of said clamping means, said lip on one of said elements engaging the other element to limit the compression force applied by said O-ring to the diaphragm, said distorted O-ring forming a seal against said lip and also exerting a sealing and clamping force through the diaphragm and against the opposing elements to thereby isolate the peripheral portion of said flexible diaphragm in said groove from external fluid pressures.

5. The combination set forth in claim 4 in which said lip is received by the inner peripheral portion of said flexible diaphragm.

6. The combination set forth in claim 5 in which the mounting is movable in an axial direction as said annular flexible diaphragm is flexed.

References Cited

UNITED STATES PATENTS

| | | | |
|---|---|---|---|
| 116,669 | 7/1871 | Blake | 92—102 |
| 389,099 | 9/1888 | Newman | 251—61 X |
| 2,678,663 | 5/1954 | Chyba | 92—102 |
| 2,786,423 | 3/1957 | Coffey | 103—150 |
| 3,101,191 | 8/1963 | Wolfensperger | 92—102 X |

MARTIN P. SCHWADRON, *Primary Examiner.*

I. C. COHEN, *Assistant Examiner.*